Sept. 24, 1963 B. J. WARMAN 3,105,116
IMPROVEMENT RELATING TO AUTOMATIC TELECOMMUNICATION SWITCHING SYSTEMS WITH PARTY LINES
Filed Dec. 28, 1959
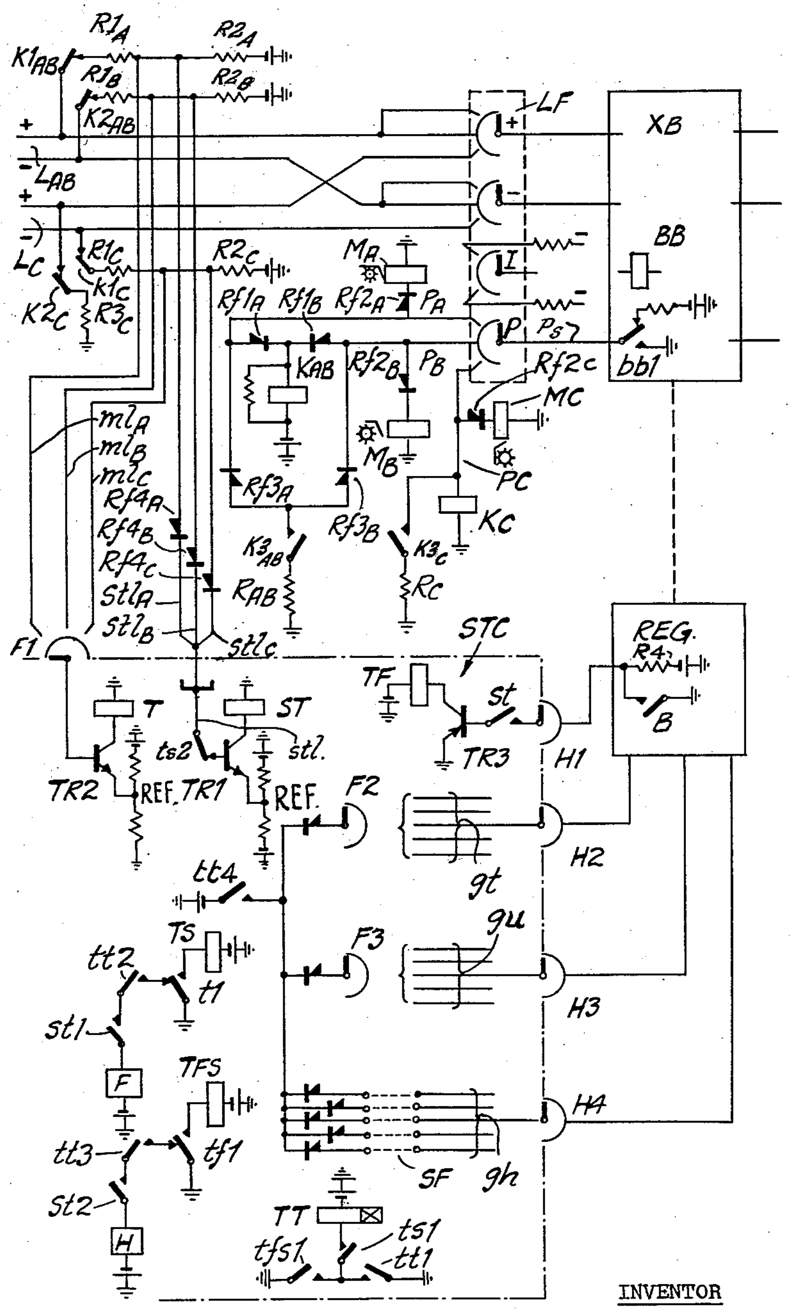
INVENTOR
BLOOMFIELD JAMES WARMAN
BY Larson and Taylor United States Patent Office 3,105,116
Patented Sept. 24, 1963

3,105,116
IMPROVEMENT RELATING TO AUTOMATIC TELECOMMUNICATION SWITCHING SYSTEMS WITH PARTY LINES

Bloomfield James Warman, Charlton, London, England, assignor to Associated Electrical Industries Limited, London, England, a company of Great Britain Filed Dec. 28, 1959, Ser. No. 862,190
Claims priority, application Great Britain Jan. 5, 1959
4 Claims. (Cl. 179—8.5)

This invention relates to automatic telecommunication, especially telephone, switching systems.

In certain automatic telephone exchange systems, lines incoming to an exchange from subscribers' stations are connected to a primary switching stage which may be either a line finding stage through which a number of lines are selectively given access to the subsequent switching mechanism by which connection towards a called line is established, or a selector hunting stage in which a selector hunter is provided individually for each subscriber and gives selective access to a number of selectors in the subsequent switching mechanism. In the latter case a calling condition applied to a line, for instance by looping it, causes the line's selector hunter to search for and stop at an outlet giving access to a free selector. In this case each line is connected to the wiper of its selector hunter, which normally is a uniselector. In the case of line finders, which may also be uniselectors, a calling condition applied to a line results in a line finder to which the line is connected being caused to search for and stop at the calling line, the lines being in this case connected to respective outlets, that is bank contacts, of the line finders. The present invention is particularly applicable to and will be described mainly in connection with a line finder system, but it may also be applicable to other systems.

The present invention is particularly concerned with equipment which in such a system is provided at an exchange for dealing with calls originating from two-party, or "shared service," lines, namely where two subscribers' or other parties' stations are served by a common line connecting them to the exchange. In a system employing selector hunters as aforesaid, each shared line may be connected in common to two selector hunters one of which functions in respect of a call from one party sharing the line to give the line access over an outlet of the selector hunter to a free selector in the subsequent switching mechanism, and the other of which functions in respect of a call from the other party. In a line finder system each shared line may be multipled to two separate outlets of each of a group of line finders in a primary switching stage, the initiation of a call by one of the line-sharing parties having the eventual result of a line finder being set to one of these two outlets, whereas for a call by the other party a line finder is set to the other outlet: each of these outlets therefore relates individually to a particular line-sharing party. These provisions in respect of selector hunter and line hunter systems permit individual metering for the two parties sharing a line. They require, however, some arrangement for discriminating between the two parties when calling.

The usual looping of the line as a calling condition on a private (unshared) line cannot in itself give discrimination in respect of shared lines. For shared lines, therefore, calling discrimination between the two parties sharing a line is commonly achieved by arranging that one of the parties, when calling, applies an earth condition to one line wire of the relevant line, whereas the other party, when calling, applies an earth condition to the other line wire of the line. This mode of discriminatory calling will be assumed for the present invention, which is concerned, as previously indicated, with the equipment included at the exchange rather than with equipment at the parties' stations, which latter equipment may conform in its components and their interconnection to that employed in known arrangements.

According to the invention a "shared service" line connected to a primary switching stage of an exchange has a line circuit comprising a first resistor chain connected between one line wire of the line and a battery or other source of potential, a second resistor chain connected between the other line wire of the line and a source of like potential, start leads extending from resistor junctions in the respective chains to a start circuit which, in response to a calling potential built up over one of these resistor chains and appearing on the relevant start lead in consequence of initiation of a call by one of the parties sharing the line, initiates a control operation by which a primary switch (line finder or selector hunter) becomes appropriately set in accordance with the particular line-sharing party that is calling as determined by the particular resistor chain from which the calling potential is received, and a cut-off relay which, being connected for operation in response to an operating condition extended thereto over a primary switch set for a call from the line, is effective to disconnect the resistor chains when so operated. The line circuit of each shared line may include two cut-off relays one of which is operated consequent on a primary switch becoming set in respect of a call from one of the line-sharing parties, and the other of which is operated consequent on a primary switch becoming set in respect of a call from the other party: that is, in a selector hunter system one or other cut-off relay would be operated over the particular one of two selector hunters, common to the line, which becomes set in respect of a call over the line, whereas in a line finder system one or other cutoff relay would be operated over the particular one of two outlets, multipled to the line, to which a line finder is set for a call. Alternatively and preferably, however, the line circuit for a shared line would include only a single cut-off relay which is connected so that it is operated when a primary switch is set in respect of a call over the line, irrespective of which of two primary switches common to the line that switch may be (selector hunter) or of which of two outlets it is set to (line finder).

In order that the invention may be more fully understood reference will now be made to the accompanying drawing, the single figure of which illustrates an embodiment of the invention as applied to a register-controlled telephone line finder system.

Referring to the drawing, it is assumed that a group of subscribers' lines, some of which are shared lines typified by $L_{AB}$ and others are unshared lines typified by $L_C$, are served by a start circuit STC which, in response to a calling condition on a line, initiates operation of a line hunter F and a register selector H included in the start circuit. The line hunter F is distinct from the line finders such as LF by which the lines can be given access to subsequent selector switching mechanism (not shown) in the exchange. The line hunter F searches for and sets to a calling line and the register selector H selects a free register such as REG able to deal with the call. The selected register REG receives from the start circuit STC, in dependence on the set position of the line hunter F, information relating to the identity of the calling line to which the line hunter has become set. On the basis of this information, the register controls the setting of a line finder such as LF to the calling line. Thereafter, in dependence on the identity of a called line as dialled or otherwise sent into the register from the calling line over the set line finder, the register proceeds to control the setting of the selector switching mechanism to establish a through-connection towards the called line.

It is further assumed, for the embodiment to be described, that the incoming lines such as $L_{AB}$ and $L_C$ are multipled over a group of uniselector line finders typified by line finder LF. At each line finder each shared line such as $L_{AB}$ is also multipled over two outlets of the line finder, these two outlets being allocated respectively to the two subscribers sharing the line. Each line finder uniselector such as LF has four arcs, namely two arcs + and — to which the line wires of each line are respectively connected, a control arc I which assists in controlling the setting of the uniselector in a line finding action, and a test arc, hereinafter called a P-arc to which, at the relevant outlets, are connected test connections such as $P_A$, $P_B$, $P_C$, hereinafter called P-wires, which are individual to the respective subscribers whether sharing a line or not. A P-wire PS individual to the uniselector is connected to the wiper of the P-arc, and in accordance with usual practice will be marked with earth potential to indicate a busy condition of the uniselector and of the subscriber to whose outlet it has been set. This busying earth potential is indicated as being applied by contacts *bb1* of a holding relay BB included in accordance with common practice in a transmission bridge XB taken into use for the call for which the line finder becomes set. The manner in which this relay BB is operated and likewise other details of the transmission bridge XB have not been shown. The typical register REG and transmission bridge XB have been shown only in block form because they are of no direct concern with the present invention and their essential details can readily be derived by one skilled in the art on the basis of known systems.

The setting of a line finder uniselector such as LF under control of a register is preferably achieved under revertive impulse control, in which case the reverted impulses would be provided from the control arc I; however, marker control from arc I is also possible.

Since the invention is primarily concerned with shared lines such as $L_{AB}$, these will be considered first. The line circuit equipment provided at the exchange for each shared line such as $L_{AB}$ includes a first resistor chain comprising two resistors $R1_A$ and $R2_A$ connected in series with a normally-closed contact $k1_{AB}$ of a cut-off relay $K_{AB}$ between earthed negative battery and one line wire (+) of the line $L_{AB}$. A second resistor chain likewise comprising two resistors $R1_B$ and $R2_B$ is connected in series with another normally-closed contact $k2_{AB}$ of the cut-off relay $K_{AB}$ between earthed negative battery and the other line wire (—). From the resistor junction in each chain extends a start lead $stl_A$ or $stl_B$ and a marking lead $ml_A$ or $ml_B$. When one of the subscribers sharing the line calls by applying earth potential to the relevant line wire (the other sharing subscriber would call by earthing the other line wire) a calling potential built up across the relevant resistor chain will appear on the start lead and marking lead connected to it. This calling potential will be more positive than the quiescent (non-calling) potential appearing on these leads.

The single cut-off relay $K_{AB}$ for each shared line such as $L_{AB}$ has one side of its operating winding connected to earthed negative battery and the other side connected in common, through respective rectifiers $Rf1_A$, $Rf1_B$, to the P-wires $P_A$ and $P_B$ for the subscribers sharing the line. The rectifiers $Rf1_A$, $Rf1_B$ are so poled that the cut-off relay $K_{AB}$ will be operated between negative battery and earth when a line finder such as LF has been set to one of these outlets and a busying (earth) potential applied to the P-wire PS of that line finder is therefore extended over it to the cut-off relay $K_{AB}$. Each of the line-sharing subscribers has an individual meter $M_A$ or $M_B$ connected between his P-wire $P_A$ or $P_B$ and earth in series with a rectifier $Rf2_A$ or $Rf2_B$ which is poled to permit operation of the meter by a positive pulse applied to the subscriber's P-wire over the P-wire PS of a line finder set to that subscriber's outlet. This positive pulse, because of its polarity, has no effect on the operated cut-off relay $K_{AB}$. The sharing subscribers' P-wires $P_A$ and $P_B$ are also shown as being connected, through respective rectifiers $Rf3_A$, $Rf3_B$, to a normally-open holding contact $k3_{AB}$ of the cut-off relay $K_{AB}$. This contact $k3_{AB}$, when closed on operation of the relay $K_{AB}$, establishes a connection through the rectifiers $Rf3_A$, $Rf3_B$ between an earthed resistance $R_{AB}$ and the P-wires $P_A$, $P_B$, thereby establishing for the cut-off relay $K_{AB}$ a local holding circuit which is independent of the line finders such as LF. The reason for providing this local holding circuit will be explained later. The rectifiers $Rf3_A$, $Rf3_B$ are poled so that they permit the flow of holding current while preventing a positive metering pulse extended to one subscriber's P-wire from reaching and operating the meter connected to the other subscriber's P-wire. A busy earth condition on either P-wire, however, holds the near side of the cut-off relay winding at earth potential and this effectively imparts a busy condition to the other P-wire also. Consequently in attempting to establish a call to either of the sharing subscribers when either of them is calling and the shared line $L_{AB}$ is therefore engaged, a final selector (not shown) which tests the subscribers' P-wire conditions in the usual manner, would meet a busy condition on the P-wire of the called subscriber and would therefore be prevented from setting to the busy line. As is envisaged in my copending application Serial No. 862,263 filed December 28, 1959, the switches (uniselectors) to which the lines are connected may serve the dual function of line finding and final selection, thus reducing the number of switches as compared with that required if separate line finders and final selectors were employed.

For non-shared lines such as $L_C$, the line circuit for each line includes a resistor chain comprising two resistors $R1_C$, $R2_C$ connected in series with a normally-closed contact $k1_C$ of a line cut-off relay $K_C$ between earthed negative battery and one line wire (—) of the line $L_C$, and a further resistor $R3_C$ connected in series with a normally-closed contact $k2_C$ of the cut-off relay $K_C$ between earth and the other line wire (+). A start lead $stl_C$ and a marking lead $ml_C$ are connected to the junction between resistors $R1_C$ and $R2_C$. A calling condition on the line (in this instance a line loop) will results in the appearance on these leads $stl_C$ and $ml_C$ of a calling potential built up across the resistor chain $R1_C$, $R2_C$ in conjunction with $R3_C$. As for the shared lines such as $L_{AB}$, this calling potential is more positive than the quiescent potential on these leads. Each line such as $L_C$ is connected to a single outlet on each of the line finders such as LF and the cut-off relay $K_C$ for the line is connected between negative battery and a P-wire $P_C$ which is connected to the relevant outlet of the line finder P-arcs. This P-wire $P_C$ is individual to the line $L_C$ and therefore to the subscriber served by this line. The cut-off relay $K_C$ will therefore be operated between negative battery and earth when a line finder such as LF has been set to the line and a busying earth potential applied to the line finder's P-wire PS is therefore extended over it to the P-wire $P_C$. On operation, the line relay $K_C$ establishes for itself a local holding circuit extending from earth through a resistor $R_C$ and contact R3 of relay $K_C$ to the P-wire $P_C$ and thence to the cut-off relay $K_C$, this holding circuit being independent of the line finders such as LF. As for the shared lines such as $L_{AB}$, a subscriber's meter such as $M_C$ is connected for each non-shared line between earth and the line's P-wire $P_C$ through a rectifier $Rf2_C$ which permits the meter $M_C$ to be operated by a positive pulse applied to the P-wire over the P-wire PS of a line finder set to the line.

All the start leads such as $stl_A$, $stl_B$, $stl_C$ from the several line circuits in the group served by the start circuit are connected through respective isolating rectifiers $Rf4_A$, $Rf4_B$, $Rf4_C$ to a common start lead *stl* which goes to the start circuit. In this start circuit, a calling potential appearing on this common start lead from any one of the lines brings about preferably through a transistor TR1 the operation of a start relay ST. Assuming that this transistor is provided and is to be rendered conductive by a calling potential so as to operate the start relay, it would be necessary for the transistor to be of N-P-N type if the common start lead *stl* is connected to its base as shown, or for the transistor to be in a so-called common base connection; this requirement is due to the relatively positive nature of the calling potential. Operation of the start relay ST initiates operation of the start circuit's line hunter F at contacts *st1* and of the register selector H at contacts *st2*, both of these being assumed to be uniselectors.

The marking leads $ml_A$, $ml_B$, $ml_C$ from the line circuits are all taken to respective outlets on an arc F1 of the line hunter F so that each outlet corresponds to a particular subscriber whether or not he has a shared line. When a subscriber is calling the relevant marking lead and therefore the relevant line finder outlet are marked by the calling potential. The line finder F, when operating, presents the marking leads *ml* in turn, again preferably through a transistor TR2 responsive to a relatively positive potential, to a line testing relay T which, in response to a calling condition on a marking lead *ml*, operates and opens its contacts *t1*, thereby stopping the line hunter F at the outlet at which this calling condition is encountered. Meanwhile the register selector H is searching for a free register.

Outlets of an arc H1 of the register selector H are marked according to the free or busy condition of respective registers to which they relate. Each such outlet is given a negative potential over a resistor such as R4 when the corresponding register is free, but this potential is replaced by earth potential when the register is busy: for this purpose the register REG is shown as including busying contacts B which the register operates, when busy, to apply earth potential to the relevant outlet of arc H1. When the register hunter H reaches a free register, the negative potential encountered on its arc H1 causes a register testing relay TF to respond through a transistor TR3 (P-N-P). Relay TF thereupon responds and stops the register hunter by opening contacts *tf1*, thereby seizing the free register for the call in process of being set up.

Operation of relay contacts *t1* and *tf1*, in addition to stopping the line hunter F and register selector H, also causes operation of relays TS and TFS, which at their contacts *ts1* and *tfs1* bring about operation of a slow-acting relay TT. This latter relay, which holds over its contacts *tt1* and contacts *tsl* dependent on relay TS remaining operated, prevents further operation of the line hunter F at contacts *tt2* and of the register selector H at contacts *tt3*. Relay TS, on operating, opens its contacts *ts2* to disconnect the start relay ST from the common start lead *stl*. Relay ST therefore releases.

The position to which the line hunter F has become set corresponds at least in part to the numerical identity of the calling subscriber, for instance the tens and units of the subscriber's number. Markings representing the values of these digits can therefore be derived from further line hunter arcs F2 and F3 on groups of identification wires *gt* and *gu*. These markings, which are applied to the wires *gt* and *gu*, preferably in coded form, on operation of relay TT by closure of its contacts *tt4*, are passed to the seized register over an appropriate number of contact arcs such as H2, H3 of the register selector and are there registered in known manner. Other markings, derived for instance in dependence on the particular start circuit concerned and therefore on the line group of the calling line, may also be passed to the register as an identification of for instance the hundreds digit of the calling subscriber's numerical identity. This is the function of the group of identification wires *gh* associated with further register selector arcs exemplified by H4, the markings being determined for instance by a strapping field SF.

On the basis of the registered identity of a calling subscriber, the register now controls the setting of a line finder such as LF to the outlet thereof which relates to this subscriber. This action, and the subsequent action of the register in receiving dialled impulses and controlling the setting of subsequent selectors to establish a through-connection towards a called line identified by these impulses, may be achieved in a manner based on known practice, for instance by revertive impulse control or marker control as already mentioned.

When a line finder such as LF becomes set to the outlet relating to a calling subscriber, a busying earth potential applied to the line finder's P-wire by operation of the holding relay BB in a transmission bridge such as XB brings about the operation, as previously explained, of the cut-off relay such as $K_{AB}$ or $K_C$ of the line serving that subscriber. The cut-off relay locks over its holding contact such as $k3_{AB}$ or $k3_C$ and disconnects the resistors such as $R1_A$, $R1_B$, $R2_A$, $R2_B$ or $R1_C$, $R2_C$, $R3_C$ from the line, thus removing the calling potential. This releases the testing relay T, which in turn releases relay TS followed by relay TT after its release lag. The start circuit is now ready to deal with another call. When the calling subscriber clears down at the end of the call, the equipment which held the call, namely the holding relay BB in the transmission bridge XB, applies a negative potential to the P-wire PS and thereby releases the operated cut-off relay $K_{AB}$ or $K_C$ as the case may be by short circuit.

If a subscriber, having initiated a call, fails to dial within a reasonable time, his line is said to be in a permanent-loop condition. To prevent a searching final selector from setting to the line if it is being called, and to prevent the permanent calling condition of the line from causing needless reseizure of the start circuit, it is desirable to "lock-out" the line in these respects. This is achieved in the arrangement being described by reason of the local holding circuit for the line's cut-off relay.

On failure of a subscriber to dial after initiating a call, a register which has been seized by the start circuit and has brought about the setting of a line finder in the manner described, will, as is common practice, release itself after a reasonable interval and clear down the seized switching mechanisms. It is arranged to do so without applying a negative P-wire releasing potential and the cut-off relay therefore remains operated over its holding circuit. Since the line finder such as LF that was set to the line is now restored to normal, no busy earth potential appears on the P-wire ($P_C$) or P-wires ($P_A$, $P_B$) of the line in the permanent-loop condition. The potential appearing on the line's P-wire or P-wires will then be determined by the potential dividing action of the winding of the cut-off relay such as $K_C$ or $K_{AB}$ in conjunction with the resistor $R_{AB}$ or $R_C$ connected in series with it in its holding circuit. This applies in regard to both unshared and shared lines. This P-wire potential in the permanent-loop condition of a line is arranged to be insufficient to allow a final selector to set to the line. Moreover the operated cut-off relay maintains the line resistors disconnected and thus prevents the calling condition of the line from having an effect at the start circuit over the starting leads or marking leads.

A more detailed form of start circuit performing the functions outlined above and also affording other facilities such as the automatic restoration to normal of line circuit locked out of service because of a permanent-loop condition later removed, is described in our copending application Serial No. 862,263 aforesaid.

What I claim is:

1. An automatic telecommunication switching system including a primary switching stage; a two-wire line circuit for a shared-service line connected to said primary switching stage, said line circuit comprising a first resistor chain connected between one line wire of the line and a source of potential, a second resistor chain connected between the other line wire of the line and a source of like potential, start leads extending from resistor junctions in the respective chains, and individual test connections for the line sharing parties; a start circuit to which said start leads extend; first means in said start circuit responsive to a calling potential built up over one of these resistor chains and appearing on the relevant start lead in consequence of initiation of a call by one of the sharing parties, further means in said start circuit for determining the particular line sharing party that is calling according to the particular resistor chain over which said calling potential is built up, said first means initiating a control operation for setting a switch of said primary stage dependent on the particular party that is calling as determined by said further means; means for applying a busy potential over the set switch to the test connection of the calling party; a single cut-off relay in said line circuit connected between a point of potential different from said busy potential and the test connection of each sharing party; contacts operated by said cut-off relay for disconnecting the resistor chains from the line wires; a separate meter and associated polarizing rectifier connected to each of said test connections for operation by a metering pulse applied thereto over the set primary stage switch; and further rectifiers connected between the cut-off relay and the test connections and poled to permit operation of this relay in response to application of busy potential to one of the test connections while insuring that the metering pulse on a test connection operates only the meter connected to that test connection.

2. A switching system as claimed in claim 1, wherein the cut-off relay has further contacts operable to establish for the relay a holding circuit including a source of holding potential and a resistor included between said source and the test connection of each line-sharing party, said resistor providing at said test connections by a potential dividing action in conjunction with the cut-off relay when said contacts are operated, a lock-out potential preventing seizure of the shared line if called.

3. A switching system as claimed in claim 1, wherein the line circuit for a shared line includes marking leads extending from resistor junctions in the respective resistor chains in the line circuit, said marking leads being additional to said start leads, and the start circuit includes as said further means a line hunter with a testing arc having outlets to which said marking leads are separately connected, together with means which in response to a calling condition on a start lead initiates operation of said line finder to set to the testing arc outlet at which said calling condition appears on the marking lead connected thereto, the particular party that is calling being determined by said further means according to the setting of the line hunter.

4. An automatic telecommunication switching system including a primary switching stage, at least one source of a first potential, a two-wire line circuit for a shared-service line connected to said primary switching stage, said line circuit comprising a first resistor chain connected between one line wire of the line and such source of said first potential, start leads and marking leads extending from resistor junctions in the respective chains, a start circuit including a line hunter with a testing arc having outlets to which said marking leads are separately connected, said start leads extending in common into the start circuit, means in the start circuit which, in response to a calling potential built-up over one of said resistor chains and appearing on the relevant start lead, initiates operation of the line hunter to set to its testing arc outlet at which said calling potential also appears on the marking lead connected to it, further means in the start circuit which, in response to a calling potential built-up over one of said resistor chains and appearing on the relevant start lead, initiates operation of the line hunter to set to its testing arc outlet at which said calling potential also appears on the marking lead connected to it, further means in the start circuit which, in response to said calling potential on a start lead, initiates a control operation by which a switch of said primary stage becomes appropriately set in accordance with the particular calling party as identified by the setting of the line hunter, said line circuit also including an individual test connection for each of the line-sharing parties, each primary switch having an individual test connection and a test arc over which, when the switch is set in response to a call from a line-sharing party, a busy potential applied to the test connection of that switch is extended to the test connection of that party, a separate call meter and associated polarizing rectifier for each party connected to the party's test connection for operation by a metering pulse extended thereto from the test connection of a primary switch set for a call from the party concerned, a single cut-off relay connected between a source of potential different from said busy potential and the test connection of each line-sharing party whereby the appearance of the latter on one of these test connections will operate the cut-off relay, and rectifiers included between said cut-off relay and the test connections with polarity permitting such operation of the cut-off relay while insuring that a metering pulse on a test connection operates only the meter connected to that connection, the cut-off relay having contacts effective on operation of the relay to establish a holding circuit for it by extending from a source of holding potential to the test connections of both line-sharing parties and thus to the cut-off relay, a connection including a resistor which by a potential dividing action in conjunction with the cut-off relay provides at said test connections, when said contacts are operated, a lock-out potential preventing seizure of the shared line if called, said holding circuit connection to the parties test connections including further respective rectifiers poled to permit the holding action while again insuring that a metering pulse on a test connection operates only the meter connected to that connection.

References Cited in the file of this patent

UNITED STATES PATENTS

| | | |
|---|---|---|
| 2,401,352 | Hersey | June 4, 1946 |
| 2,615,094 | Mitchell | Oct. 21, 1952 |
| 2,695,928 | Joel | Nov. 30, 1954 |
| 2,794,859 | Abbott et al. | June 4, 1957 |
| 2,820,100 | Abbott | Jan. 14, 1958 |
| 2,820,848 | Horwitz et al. | Jan. 21, 1958 |
| 2,901,544 | Collins | Aug. 25, 1959 |